United States Patent [19]
Kiyaji et al.

[11] Patent Number: 5,621,395
[45] Date of Patent: Apr. 15, 1997

[54] NETWORKING APPARATUS WHICH DETECTS A STOPPAGE OF DATA TRANSFER IN A PROCESSING APPARATUS ON A DATA ORIGINATION SIDE AND THEN CANCELS THE CORRESPONDING PATH IN THE SWITCHING UNIT

[75] Inventors: Akihito Kiyaji, Sapporo; Hiroshi Komatsuda, Kawasaki; Masayuki Katori, Kawasaki; Kenichi Ishizaka, Kawasaki, all of Japan

[73] Assignee: Fujitsu Limited, Kawasaki, Japan

[21] Appl. No.: 445,731

[22] Filed: May 22, 1995

Related U.S. Application Data

[63] Continuation of Ser. No. 976,426, Nov. 13, 1992, abandoned.

[30] Foreign Application Priority Data

Nov. 15, 1991 [JP] Japan .................................. 3-300264

[51] Int. Cl.⁶ .................................. G05B 23/02
[52] U.S. Cl. .................. 340/825.06; 307/40; 371/62; 340/825.52
[58] Field of Search .................. 340/825.06, 825.16, 340/825.79, 825.52; 370/60, 68.1, 84, 85.12, 94.1, 110.1; 371/62, 32, 33, 57.1; 307/40; 375/369; 395/200.14

[56] References Cited

U.S. PATENT DOCUMENTS

| | | |
|---|---|---|
| 2,978,676 | 4/1961 | Spencer . |
| 4,236,594 | 12/1980 | Ramsperger . |
| 4,499,567 | 2/1985 | Armstrong . |
| 4,554,461 | 11/1985 | Oho et al. ............................ 371/62 |
| 4,901,348 | 2/1990 | Nichols et al. .................. 340/825.52 |
| 5,166,674 | 11/1992 | Baum et al. ...................... 340/825.07 |
| 5,194,846 | 3/1993 | Lee et al. ......................... 340/825.06 |
| 5,252,961 | 10/1993 | Yamauchi ........................ 340/825.07 |
| 5,293,384 | 3/1994 | Keeley et al. ........................ 371/62 |

FOREIGN PATENT DOCUMENTS

| | | |
|---|---|---|
| 58-172248 | 4/1983 | Japan . |
| 62-16646 | 1/1987 | Japan . |
| 63-73742 | 4/1988 | Japan . |

*Primary Examiner*—Michael Horabik
*Assistant Examiner*—Edward Merz
*Attorney, Agent, or Firm*—Staas & Halsey

[57] ABSTRACT

A networking apparatus has its switching unit set a path for a data transfer from a processing apparatus on the data origination side to a processing apparatus on the data termination side. In case of a stop in the processing apparatus on the data origination side during the data transfer, the networking apparatus has its offline status detecting unit detect the stop by the presence or absence of an online status indication signal from the processing apparatus on the data origination side and generate an offline status indication signal. The networking apparatus has its controlling unit receive the offline status indication signal, and generate a simulated end-of-data signal, indicating a consummation of a data transfer, for transmission to a switching unit. The networking apparatus has its switching unit detect an end of data by receiving the simulated end-of-data signal, and cancel the path for the data transfer from the processing apparatus on the data origination side to the processing apparatus on the data termination side.

6 Claims, 7 Drawing Sheets

NETWORKING APPARATUS WHICH DETECTS A STOPPAGE OF DATA TRANSFER IN A PROCESSING APPARATUS ON A DATA ORIGINATION SIDE AND THEN CANCELS THE CORRESPONDING PATH IN THE SWITCHING UNIT

This application is a continuation of application Ser. No. 07/976,426, filed Nov. 13, 1992, now abandoned.

BACKGROUND OF THE INVENTION

1. Field of the Invention

This invention pertains to a networking apparatus for conducting data communications among a plurality of processing apparatuses, and more particularly to a networking apparatus capable of enabling other processing apparatuses to conduct subsequent data communications, when a processing apparatus on a data origination side stops.

2. Description of the Related Arts

Recently, as requests for data communications systems become ever more diverse and advanced, networks each accommodating a large number of processing apparatuses have begun to exchange communications data on a mutual basis. As systems become ever more highly integrated on a larger scale, their maintenance functions become even more critical.

Figure 1:
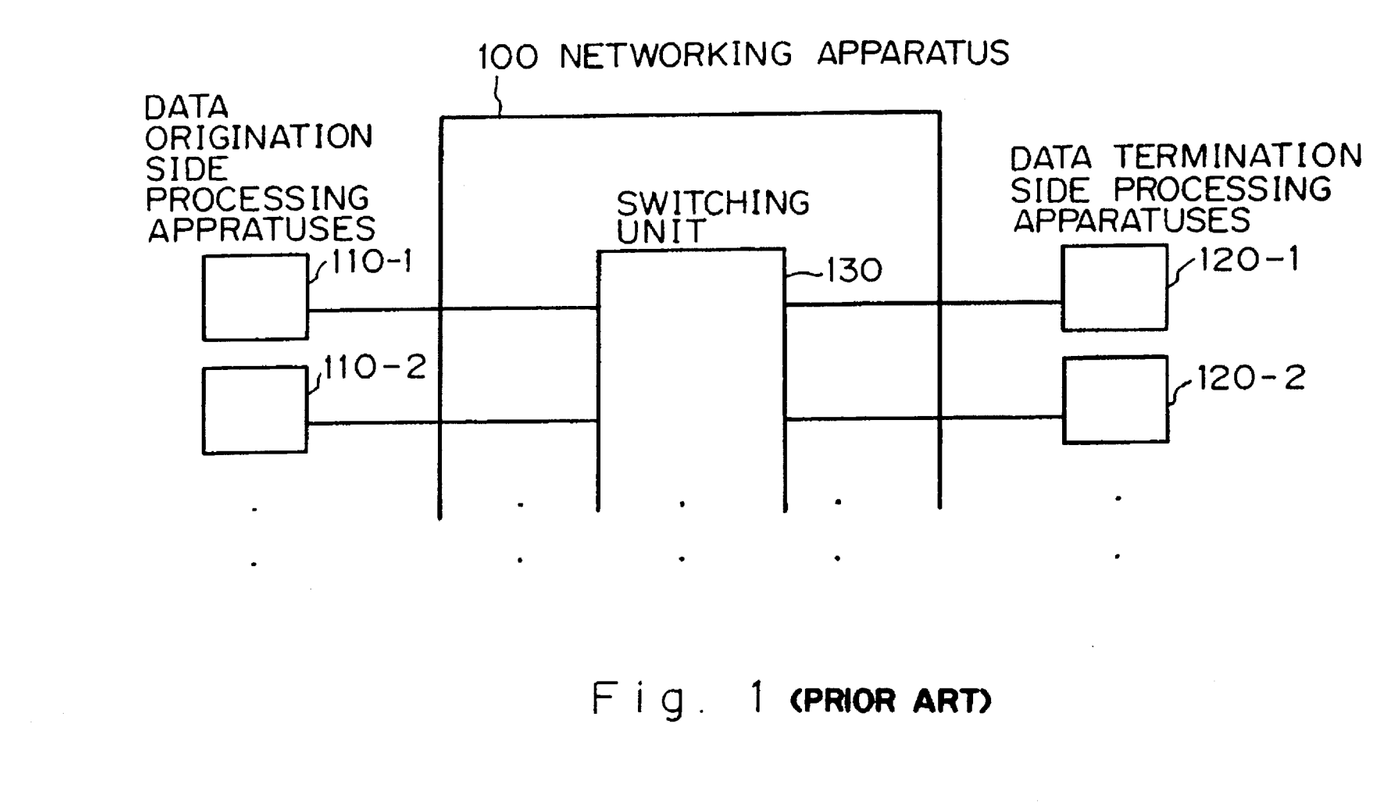
FIG. 1 is a block diagram showing a system configuration of a conventional networking apparatus.

FIG. 1 is a block diagram showing a system configuration of a conventional networking apparatus.

A networking apparatus 100 is connected with a plurality of processing apparatuses, each of which having equal functions. Assume here for the sake of convenience that a group of data origination side processing apparatuses 110 (comprising a plurality of data origination side processing apparatuses 110-1, 110-2, . . . ) transmits data packets and that a group of data termination side processing apparatuses 120 (comprising a plurality of data termination side processing apparatuses 120-1, 120-2, . . . ) receives the data packets. The networking apparatus 100 has a switching unit 130, which forms paths for the data packets between the group of data origination side processing apparatuses 110 and the group of data termination side processing apparatuses 120, under control of the networking apparatus 100 for executing data communications.

Figure 2:
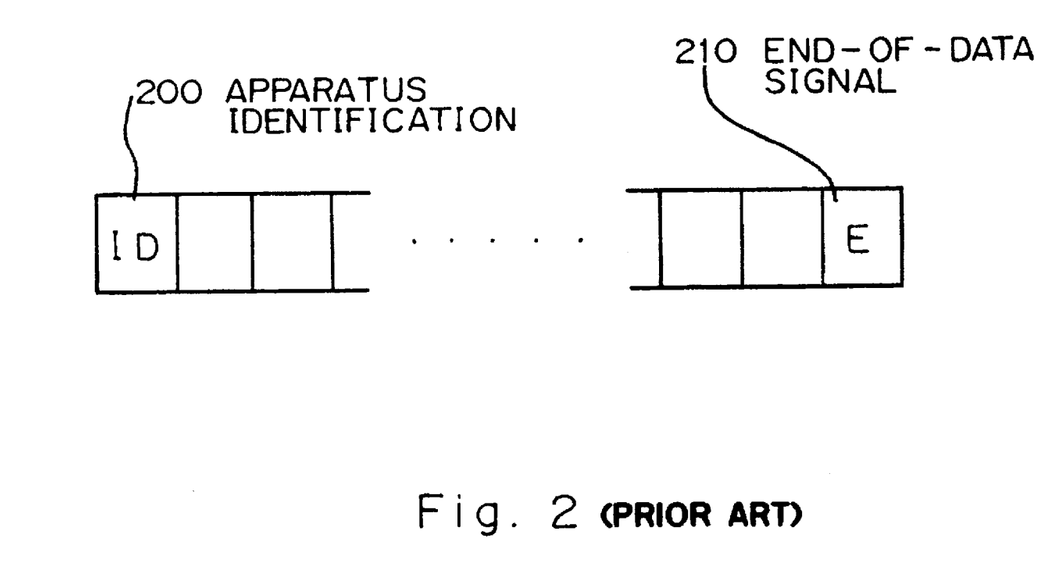
FIG. 2 illustrates the contents of a data packet transmitted in data communications.

FIG. 2 illustrates the contents of a data packet transmitted in data communications.

The head end of the data packet stores an apparatus identification (ID) 200 for designating a receiving one in the group of data termination side processing apparatuses 120. The tail end of the data packet stores an end-of-data signal (E) 210.

The description of the related arts continues by returning to FIG. 1.

On detecting the apparatus identification (ID) 200 at the head end of a data packet transmitted from one in the group of data origination side processing apparatuses 110, the networking apparatus 100 selects one in the group of data termination side processing apparatuses 120, and sets a path in the switching unit 130 for transmission of the data packet to the selected one in the data termination side processing apparatuses 120. On transmitting the end-of-data signal (E) 210 at the tail end of a data packet transmitted from the one in the group of data origination side processing apparatuses 110, the networking apparatus 100 cancels the path, thereby consummating a transmission of the data packet. That is, a reception of the apparatus identification (ID) 200 and the end-of-data signal 210 in a data packet causes the networking apparatus 100 to set and cancel a path for the data packet, respectively.

Assume here that the pertinent one in the group of data origination side processing apparatuses 110 stops during data communications, for instance. Although this one in the group of data origination side processing apparatuses 110 aborts a data packet currently being transmitted, because the networking apparatus 100 has not received an end-of-data signal (E) 210, the networking apparatus 100 cannot cancel the path in the switching unit 130.

When the path of an aborted data packet remains set in the switching unit 130, an attempt by another one in the group of data origination side processing apparatuses 110 to transmit a data packet to the same one in the group of data termination side processing apparatuses 120 causes the networking apparatus 100 to hang up, due to an inability of the switching unit 130 to set a path to the same one in the group of data termination side processing apparatuses 120, since the path of the aborted data packet between the stopped one in the group of data origination side processing apparatuses 110 and the same one in the group of data termination side processing apparatuses 120 remains set. A replacement of the stopped one in the group of data origination side processing apparatuses 110 does not enable the path to be reset, because the networking apparatus 100 waits for the remainder of the aborted data packet.

Consequently, the conventional system shown in FIG. 1 requires the networking apparatus 100 to have the switching unit 130 reset its paths entirely, when any one in the group of data transmission side processing apparatuses 110 stops.

The above described conventional system requiring the networking apparatus 100 to have the switching unit 130 reset its paths entirely upon stop in one in the group of data origination side processing apparatuses 110 has a serious problem. This is because the complete reset of paths by the switching unit 130 causes the networking apparatus 100 to suspend all jobs related to data communications between other processing apparatuses by data packets transmitted along other paths.

SUMMARY OF THE INVENTION

This invention, conceived based on the above background, aims at realizing a networking apparatus capable of replacing a stopped one in a group of data origination side processing apparatuses without suspending any other jobs.

This invention is premised on a networking apparatus having a switching unit for processing data communications by setting a path for a data packet from one in the group of data origination side processing apparatuses to one in the group of data termination side processing apparatuses.

The networking apparatus has a group of offline status detecting units for detecting a service suspension due to a stop in one in the group of data origination side processing apparatuses and for transmitting an offline status indication signal indicating a stop.

The networking apparatus also has a group of control units for receiving an offline status indication signal transmitted from the corresponding one in the group of offline status detecting units, for generating a simulated end-of-data signal, and for terminating data communications by canceling a path in the switching unit when an end-of-data signal supposed to be transmitted from one in the group of data origination side processing apparatuses is not received.

According to the above described configuration of this invention, when one of the data origination side processing apparatuses stops during data communications, a generation of an end-of-data signal within the networking apparatus for terminating a path enables a stopped one of the data origination side processing apparatuses to be replaced without suspending any other jobs.

This enables a networking apparatus to continue executing data communications without lowering its overall efficiency, even when one in the group of data origination side processing apparatuses experiences a stop.

BRIEF DESCRIPTION OF THE DRAWINGS

One of ordinary skill in the art can easily understand additional features and objects of this invention from the description of the preferred embodiments and some of the attached drawings. In the drawings.

DESCRIPTION OF THE PREFERRED EMBODIMENT

Overview of the Underlying Principles

Figure 3:
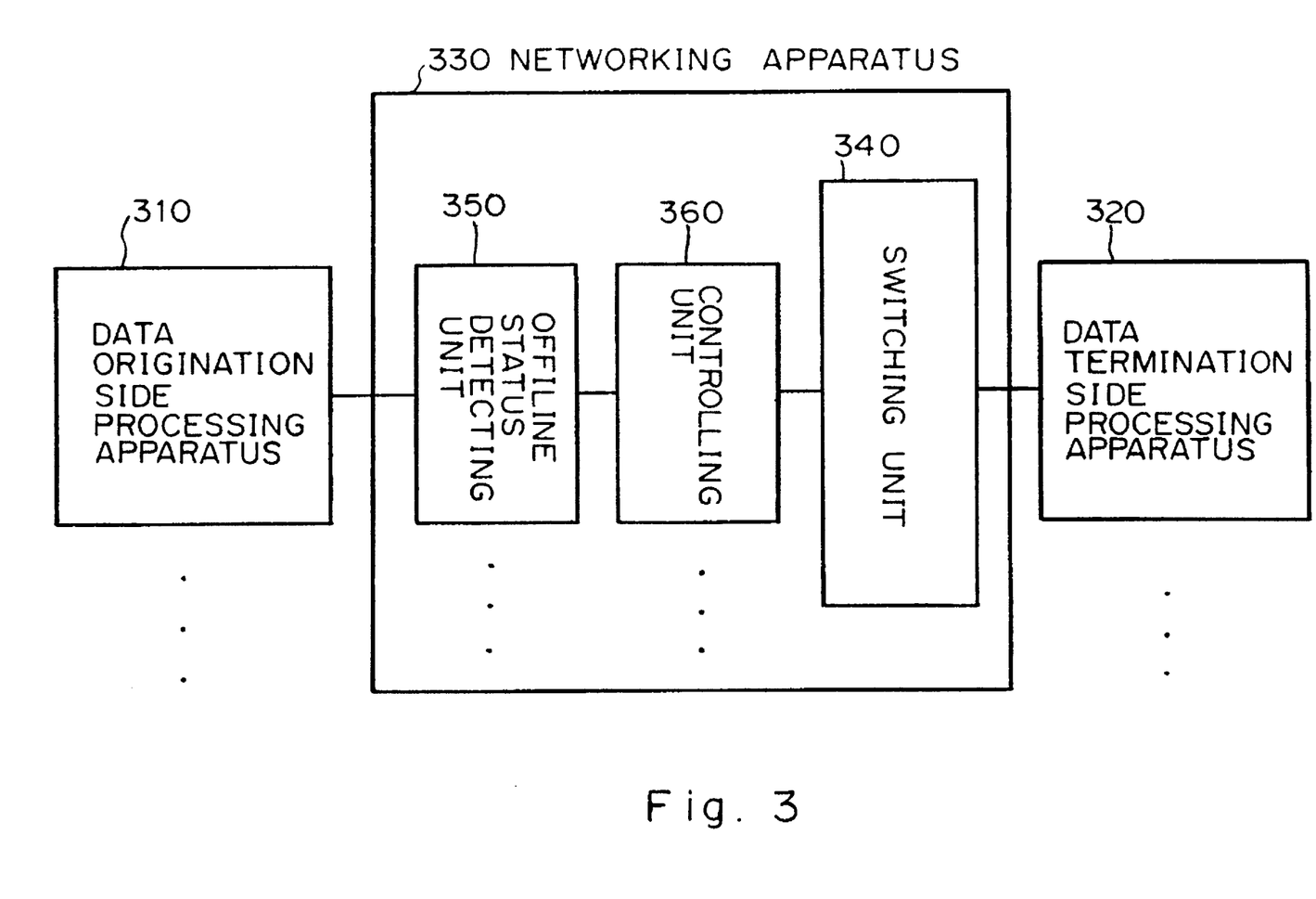
FIG. 3 is a block diagram of this invention.

FIG. 3 is a block diagram of this invention.

The system of this invention comprises a data origination side processing apparatus 310 for transmitting data, a data termination side processing apparatus 320 for receiving data, and a networking apparatus 330. Both the data origination side processing apparatus 310 and the data termination side processing apparatus 320 are capable of transmitting and receiving data. However, for the purpose of distinguishing the origination side from the termination side, the above designations are made for these processing apparatuses. Therefore, it is assumed that the data termination side processing apparatus 320 receives via the networking apparatus 330 data transmitted from the data origination side processing apparatus 310.

Also, a switching unit 340 in the networking apparatus 330 sets a path for transferring a data packet by connecting the data origination side processing apparatus 310 with the data termination side processing apparatus 320, based on the apparatus identification (ID) 200 of the data termination side processing apparatus 320, included in the data packet transmitted from the data origination side processing apparatus 310 to the networking apparatus 330.

An offline status detecting unit 350 provided in the networking apparatus 330 detects a service suspension (an offline status) due to a stop in the data origination side processing apparatus 310, and transmits an offline status indication signal indicating the offline status.

A controlling unit 360 provided in the networking apparatus 330 receives the offline status indication signal, and generates a simulated end-of-data signal for transmission to the switching unit 340. When an end-of-data signal (E) 210 in a data packet transmitted from the data origination side processing apparatus 310 has not arrived, the simulated end-of-data signal causes the switching unit 340 to cancel the path it set for a data packet, thereby consummating data communications.

The operations pursuant to the above principles will be explained below.

In ordinary data communications between the data origination side processing apparatus 310 and the data termination side processing apparatus 320, the data origination side processing apparatus 310 sends a data packet to the networking apparatus 330, which has the switching unit 340 set a path, based on the apparatus identification (ID) of the data termination side processing apparatus 320 included in the data packet, for transmission of the data packet to the data termination side processing apparatus 320.

At this time, the networking apparatus 330 has the offline status detecting unit 350 monitor the status of the data origination side processing apparatus 310. More specifically, the networking apparatus 330 has the offline status detecting unit 350 receive an online status indication signal for monitoring the status of the data origination side processing apparatus 310. If the online status indication signal indicates a stop, the offline status detecting unit 350 transmits an offline status indication signal to the controlling unit 360 provided also in the networking apparatus 330.

On receiving the offline status indication signal from the offline status detecting unit 350, the controlling unit 360 generates a simulated end-of-data signal for consummating data communications, which causes the switching unit 340 to cancel a path when the end-of-data signal (E) is not duly received from the data origination side processing apparatus 310.

Explanation of A Concrete Embodiment

A concrete embodiment of this invention is explained below by referring to some of the attached drawings.

Figure 4:
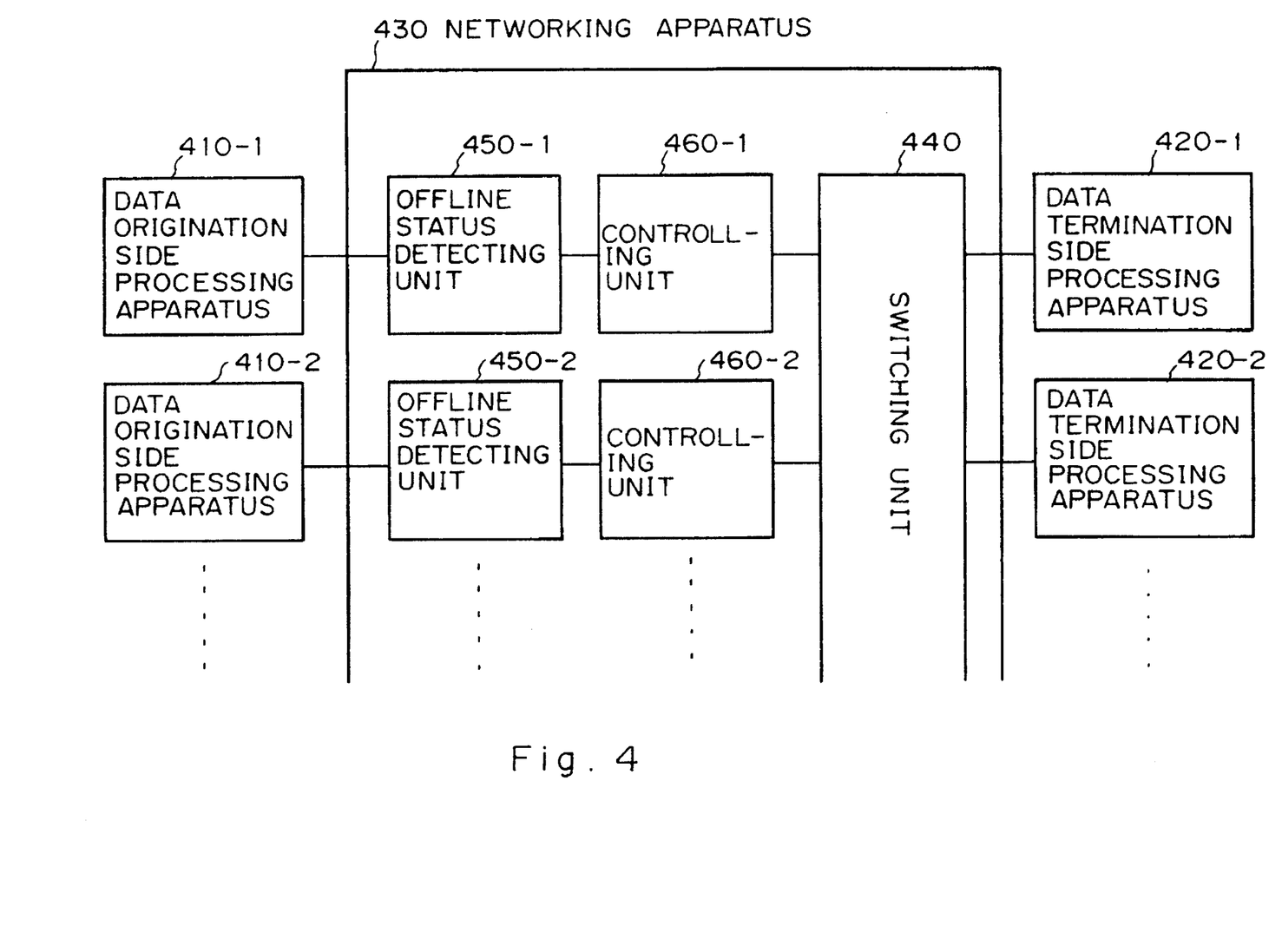
FIG. 4 illustrates a system configuration of a preferred embodiment of this invention.

FIG. 4 illustrates a system configuration of a preferred embodiment of this invention.

The system shown in FIG. 4 is structured on a networking apparatus 430, which is connected with two [2] groups of processing apparatuses (410 and 420) comprising interchangeable members. More specifically, communications channels connect the networking apparatus 430 with a group of data origination side processing apparatuses 410 and a group of data termination side processing apparatuses 420, where the group of data origination side processing apparatuses 410 comprises a plurality of data origination side processing apparatuses 410-1, 410-2, . . . and the group of data termination side processing apparatuses 420 comprises a plurality of data termination side processing apparatuses 420-1, 420-2, . . . , each having the same structure. Here, just for the sake of convenience, a member in the group of data origination side processing apparatuses 410 is distinguished from a member in the group of data termination side processing apparatuses 420 in the following description.

The networking apparatus 430 has a switching unit 440 for executing data communications by setting paths between the group of data origination side processing apparatuses 410 and the group of data termination side processing apparatuses 420.

Further, the networking apparatus 430 comprises a group of offline status detecting units 450 and a group of controlling units 460, in addition to the switching unit 440. The group of offline status detecting units 450 comprises a plurality of offline status detecting units 450-1, 450-2, ..., and the group of controlling units 460 comprises a plurality of controlling units 460-1, 460-2, ....

The group of offline status detecting units 450 connects the group of data origination side processing apparatuses 410 with the group of controlling units 460. The switching unit 440 connects the group of controlling units 460 with the group of data termination side processing apparatuses 420.

More specifically, the plurality of offline status detecting units 450-1, 450-2, ... respectively connect the plurality of data origination side processing apparatuses 410-1, 410-2, ... with the plurality of controlling units 420-1, 420-2, ..., on a one-to-one basis, and the switching unit 440 connects the plurality of controlling units 460-1, 460-2, ... with the plurality of data termination side processing apparatuses 420-1, 420-2, ....

The operations of this system are explained below. In the event of a stop in any of the plurality of data origination side processing apparatuses 410-1, 410-2, ..., the corresponding one of the plurality of offline status detecting units 450-1, 450-2, ... detects it, and notifies the corresponding one of the plurality of controlling units 460-1, 460-2, ... of the stop. On receiving from the corresponding one of the plurality of offline status detecting units 450-1, 450-2, ... the notification of a stop in the corresponding one of the plurality of data origination side processing apparatuses 410-1, 410-2, ..., the corresponding one of the plurality of controlling units 460-1, 460-2, ... generates a simulated end-of-data signal, substituting for the end-of-data signal (E) of a data packet, and supplies it to the switching unit 440. The switching unit 440 in turn transmits the simulated end-of-data signal to one of the plurality of data termination side processing apparatuses 420-1, 420-2, ... currently being on a path for the data packet from the one of the plurality of data origination side processing apparatuses 410-1, 410-2, ... having the stop, and cancels the path, thereby aborting the data communications along the path.

Figure 5:
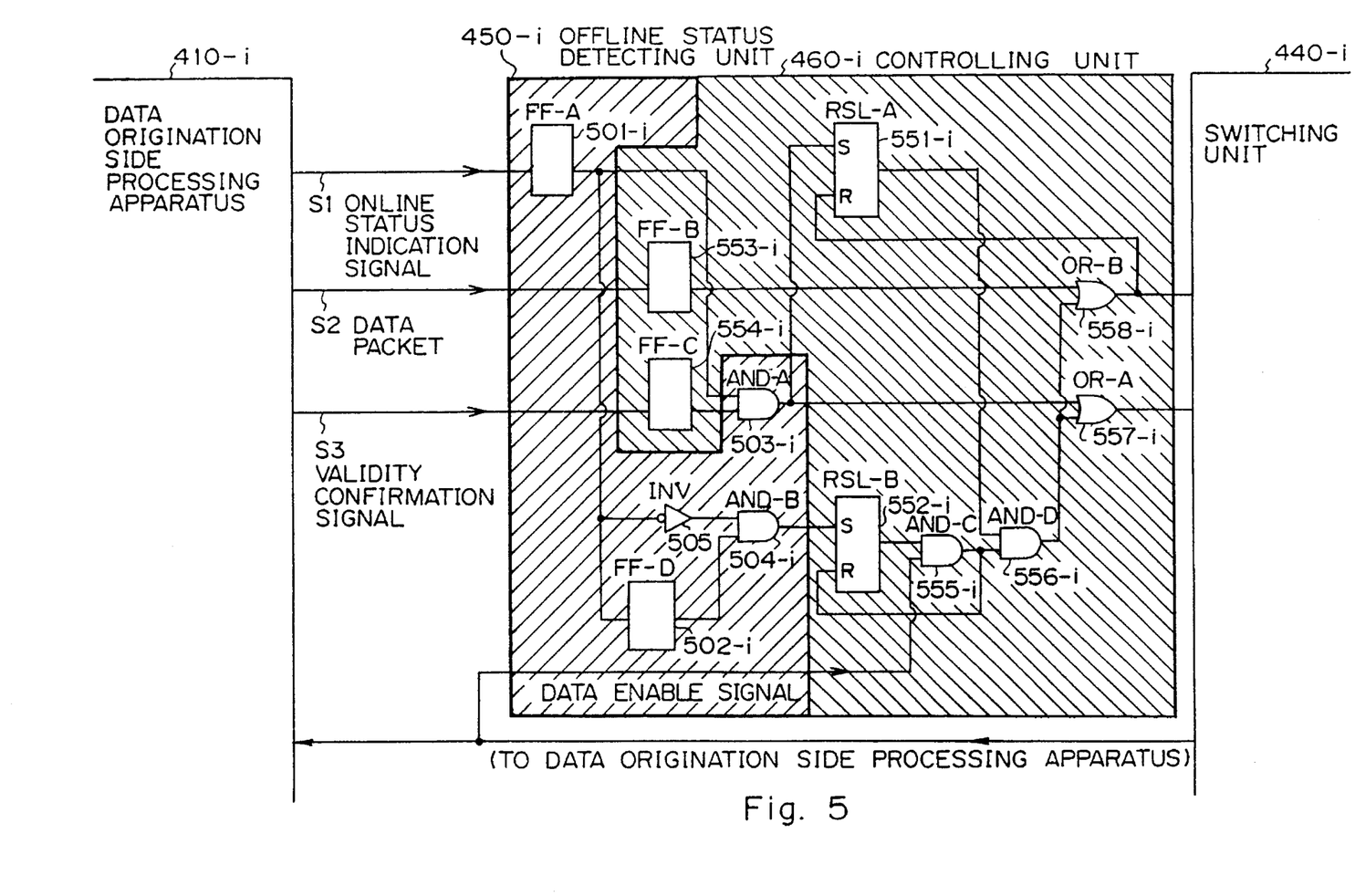
FIG. 5 is a block diagram of an offline status detecting unit and a controlling unit.

FIG. 5 is a block diagram of an offline status detecting unit and a controlling unit.

More specifically, FIG. 5 shows in detail structures of an offline status detecting unit 450-$i$ (one of the plurality of offline status detecting units 450-1, 450-2, ...) and a controlling unit 460-$i$ (one of the plurality of controlling units 460-1, 460-2, ...), which form a pair corresponding to a data origination side processing apparatus 410-$i$ (one of the plurality of data origination side processing apparatuses 410-1, 410-2, ...), in the networking apparatus 430 as shown in FIG. 4.

The offline status detecting unit 450-$i$ comprises two [2] flip-flops FF-A 501-$i$ and FF-D 502-$i$, two [2] AND gates AND-A 503-$i$ and AND-B 504-$i$, and one [1] inverter INV 505-$i$. The controlling unit 460-$i$ comprises two [2] RS latches RSL-A 551-$i$ and RSL-B 552-$i$, two [2] flip-flops FF-B 553-$i$ and FF-C 554-$i$, two [2] AND gates AND-C 555-$i$ and AND-D 556-$i$, and two [2] OR gates OR-A 557-$i$ and OR-B 558-$i$.

The offline status detecting unit 450-$i$ receives from the data origination side processing apparatus 410-$i$ an online status indication signal S1, a data packet S2, and a validity confirmation signal S3.

The online status indication signal S1 indicates, e.g. by "one [1]/high [H]" for "in order" or "zero [0]/low [L]" for "out of order", whether the data origination side processing apparatus 410-$i$ is in order or out of order. That is, the online status indication signal S1 falls to "zero [0]/low [L]", when the data origination side processing apparatus 410-$i$ becomes out of order.

The data packet S2 carries communications data transmitted from the data origination side processing apparatus 410-$i$ to a data termination side processing apparatus 420-$k$ (one of the plurality of data termination side processing apparatuses 420-1, 420-2, ...). As shown in FIG. 2, conventionally, a data packet S2 carries the apparatus identification (ID) 200 of the data termination side processing apparatus 420-$k$ at its head end and the end-of-data signal (E) 201 at its tail end.

The validity confirmation signal S3 indicates, e.g. by "one [1]/high [H]" for "present" or "zero [0]/low [L]" for "absent", whether the data packet S2 is present or absent. The switching unit 440 does not receive the data packet S2, unless the validity confirmation signal S3 is "one [1]/high [H]".

The offline status detecting unit 450-$i$ has FF-A 501-$i$ receive the online status indication signal S1. The controlling unit 460-$i$ has FF-B 553-$i$ receive the data packet S2 and FF-C 554-$i$ receive the validity confirmation signal S3.

The offline status detecting unit 450-$i$ has FF-D 502-$i$, INV 505-$i$ and AND-A 503-$i$ receive an output signal from FF-A 501-$i$. As well, the offline status detecting unit 450-$i$ has AND-A 503-$i$ receive an output signal from FF-C 554-$i$. Also, the offline status detecting unit 450-$i$ has AND-B 504-$i$ receive an output signal from INV 505-$i$ and FF-D 502-$i$.

The controlling unit 460-$i$ has RSL-B 552-$i$ receive as its set signal an output signal from AND-B 504-$i$. In addition, the controlling unit 460-$i$ has AND-C 555-$i$ receive an output signal from RSL-B 552-$i$ and a data enable signal transmitted from the switching unit 440 to the data origination side processing apparatus 410-$i$. (The switching unit 440 allows the data origination side processing apparatus 410-$i$ to transmit a data packet to itself, only when it supplies the data enable signal having a value "one [1]/high [H]".) Further, the controlling unit 460-$i$ has AND-D 556-$i$ receive an output signal from AND-C 555-$i$. And the controlling unit 460-$i$ has RSL-B 552-$i$ receive as its reset signal the same output signal from AND-C 555-$i$.

Furthermore, the controlling unit 460-$i$ has RSL-A 551-$i$ receive as its set signal an output signal from AND-A 503-$i$, AND-D 556-$i$ receive an output signal from RSL-A 551-$i$, OR-A 557-$i$ receive an output signal from AND-D 556-$i$ and an output signal from AND-A 503-$i$ in the offline status detecting unit 450-$i$, and OR-B 558-$i$ receive the output signal from AND-D 556-$i$ and an output signal from FF-B 553-$i$.

Then, the controlling unit 460-$i$ supplies to the switching unit 440 an output signal from OR-A 557-$i$ and an output signal from OR-B 558-$i$. Finally, the controlling unit 460-$i$ has RSL-A 551-$i$ receive an output signal from OR-B 558-$i$ as its reset signal.

The online status detecting unit 450-$i$ has FF-A 501-$i$ receive as its input signal the online status indication signal for detecting a stop in the data origination side processing apparatus 410-$i$. Because the online status indication signal S1 is "zero [0]/low [L]" when the data origination side processing apparatus 410-$i$ breaks down, the output from FF-A 501-$i$ falls to "zero [0]/low [L]", too. The offline status detecting unit 450-$i$ causes INV 505-$i$ and FF-D 502-$i$ to have AND-B 504-$i$ output for a predetermined duration an offline status indication signal, which indicates that the data origination side processing apparatus 410-$i$ has experienced a stop.

The controlling unit 460-$i$ has FF-B 553-$i$ and FF-C 554-$i$ receive as their respective input signals the packet data S2 and the validity confirmation signal S3. During a normal operation, i.e. when the data origination side processing apparatus 410-$i$ has not experienced any stop and both the validity confirmation signal S3 and the data enable signal "one [1]/high [H]", the data origination side processing apparatus 410-$i$ has OR-B 558-$i$ and OR-A 557-$i$ respectively output the packet data S2 and the validity confirmation signal S3 as input signals to the switching unit 440.

Here, when the data origination side processing apparatus 410-$i$ experiences a stop, the controlling unit 460-$i$ no longer has OR-B 558-$i$ and OR-A 557-$i$ output the packet data S2 and the validity confirmation signal S3 to the switching unit 440. However, based on the offline status indication signal outputted from AND-B 504-$i$ in the offline status detecting unit 450-$i$, the controlling unit 460-$i$ has RSL-B 552-$i$, AND-C 555-$i$ and AND-D 556-$i$ generate a simulated end-of-data signal (pari passu end-of-data signal (E) 210 at the end of the packet data S2) and a simulated validity confirmation signal (pari passu the validity confirmation signal S3), and has RSL-A 551-$i$ output those respectively via OR-B 558-$i$ and OR-A 557-$i$ to the switching unit 440. On receiving the simulated end-of-data signal and the simulated validity confirmation signal, the switching unit 440 cancels the path, thereby consummating the data communications between the data origination side processing apparatus 410-$i$ and the data termination side processing apparatus 420-$k$.

Figure 6:
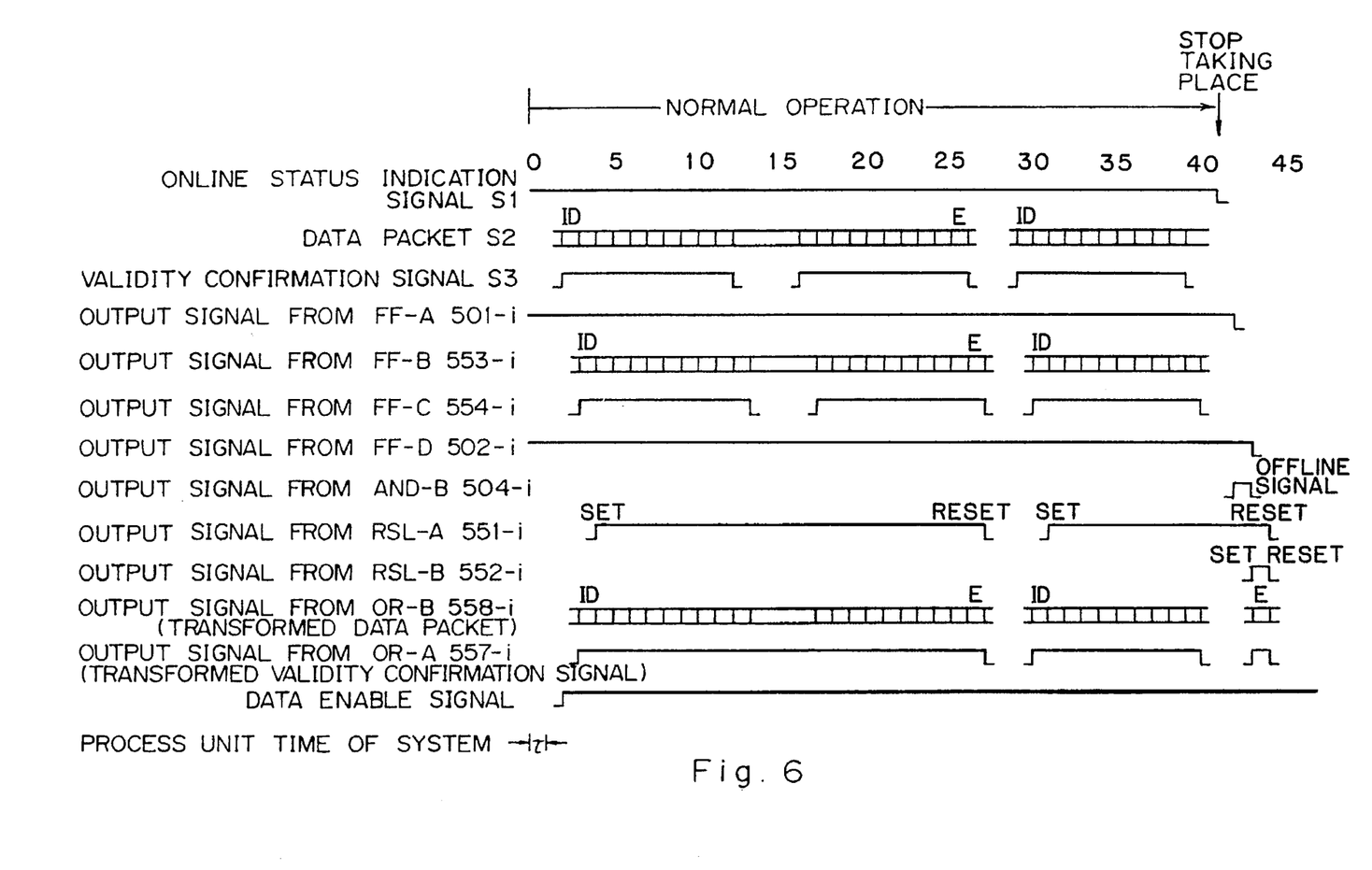
FIG. 6 is a timing chart of the preferred embodiment of this invention.

FIG. 6 is a timing chart of the preferred embodiment of this invention.

$\tau$ is defined as a unit processing time interval in the system.

Explained first are operations when the data origination side processing apparatus 410-$i$ functions normally. At this time, the data origination side processing apparatus 410-$i$ transmits a data packet normally, and the online status indication signal S1 is "one [1]/high [H]" indicating that the data origination side processing apparatus 410-$i$ is in order. This causes the output signals from FF-A 501-$i$ and FF-B 505-$i$ in the offline status detecting unit 450-$i$ to be both "one [1]/high [H]". Contemporaneously, the controlling unit 460-$i$ has FF-B 553-$i$ and FF-C 554-$i$ receive the data packet S2 and the validity confirmation signal S3, respectively. Then, the controlling unit 460-$i$ has FF-B 553-$i$ and FF-C 554-$i$ supply to the switching unit 440 their output signals both delayed by $\tau$.

The output signal from RSL-A 551-$i$ in the controlling unit 460-$i$ expresses whether or not the networking apparatus 430 is currently transferring the data packet S2. It remains "one [1]/high [H]" during a single session of data communications between the data origination side processing apparatus 410-$i$ and the data termination side processing apparatus 420-$k$. This prevents the end-of-data signal (E) 210 from being transmitted unless the data packet S2 is being transferred.

Explained second are operations when the data origination side processing apparatus 410-$i$ experiences a stop. At this time, the data origination side processing apparatus 410-$i$ stops transmitting a data packet, and the online status indication signal S1 becomes "zero [0]/low [L]". Then, the offline status detecting unit 450-$i$ has FF-A 501-$i$ supply its output signal delayed by $\tau$ to AND-A 503-$i$, INV 505-$i$ and FF-D 502-$i$.

Because AND-A 503-$i$ receives "zero [0]/low [L]" as one [1] of its input signals, it always supplies "zero [0]/low [L]" as its output signal. This prevents the switching unit 440 from unnecessarily receiving the validity confirmation signal S3.

On account of its input signals received from INV 505-$i$ and FF-D 502-$i$, AND-B 504-$i$ supplies an offline status indication signal for a duration $\tau$ after a lapse of $\tau$ from the time at which the online status indication signal S1 falls to "zero [0]/low [L]". RSL-B 552-$i$ receives the offline status indication signal as its set signal, and supplies a simulated end-of-data signal for the duration $\tau$ via OR-B 558-$i$ to the switching unit 440. Because the switching unit 440 cannot receive the simulated end-of-data signal unless the validity confirmation signal S3 is "one [1]/high [H]", OR-A 557-$i$ concurrently supplies to the switching unit 440 a transformed validity confirmation signal for the same duration $\tau$.

More specifically, when the output signal from FF-A 501-$i$ falls to "zero [0]/low [L]", the output signal from INV 505-$i$, which is an input signal to AND-B 504-$i$, rises to "one [1]/high [H]". Because the input signal to FF-D 502-$i$ falls to "zero [0]/low [L]", its output signal also falls to "zero [0]/low [L]" after delayed by $\tau$. AND-B 504-$i$ receives the output signal from FF-D 502-$i$ as its other input signal. As such, AND-B 504-$i$ obtains the logical conjunction of the output signal from INV 505-$i$ and the output signal from FF-D 502-$i$. Hence, the output signal from AND-B 504-$i$, which is the offline status indication signal, is "one [1]/high [H]" for the period from the instant in time at which the output signal from FF-A 501-$i$ falls to "zero [0]/low [L]" to the instant in time at which the output signal from FF-D 502-$i$ falls to "zero [0]/low [L]", i.e. for the duration $\tau$. That is, the offline status detecting unit 450-$i$ has AND-B 504-$i$ output the offline status indication signal to the controlling unit 460-$i$.

The controlling unit 460-$i$ has RSL-B 552-$i$ receive as its set signal the offline status indication signal, which the offline status detecting unit 450-$i$ has AND-B 504-$i$ output for the duration $\tau$. This set signal sets the output signal from RSL-B 552-$i$ to "one [1]/high [H]" delayed by $\tau$ after a rise of the offline status indication signal. AND-C 553-$i$ receives as its input signals the output signal from RSL-B 552-$i$ and the data enable signal from the switching unit 440. The data enable signal indicates the readiness of the switching unit 440 for a data transfer of the data packet S2 from the data origination side processing apparatus 410-$i$. When the data enable signal is "one [1]/high [H]", the output signal from AND-C 553-$i$ is also "one [1]/high [H]". RSL-B 552-$i$ receives as its reset signal the output signal from AND-C 553-$i$, which resets the output signal from RSL-B 552-$i$ to "zero [0]/low [L]" delayed by $\tau$ after the output signal from AND-C 553-$i$ rises to "one [1]/high [H]". Thus, RSL-B 552-$i$ generates as its output signal a set-reset signal for the duration $\tau$.

Meanwhile, when the data enable signal is "zero [0]/low [L]", because the switching unit 440 is not ready for a data transfer of the data packet S2 from the data origination side processing apparatus 410-$i$, although the output signal from AND-C 553-$i$ remains "zero [0]/low [L]" and the output signal from RSL-B 552-$i$ remains set to "one [1]/high [H]", the controlling unit 460-$i$ does not receive the offline status indication signal before the data enable signal rises to "one [1]/high [H]".

On the other hand, the controlling unit 460-$i$ has the output signal from RSL-A 551-$i$ remain set to "one [1]/high [H]" after the data origination side processing apparatus 410-$i$ starts the data transfer of the data packet S2, even if the data origination side processing apparatus 410-$i$ subsequently experiences a stop. AND-D 556-*i* receives as its two [2] input signals the respective output signals from RSL-A 551-*i* and AND-C 553-*i*. Accordingly, AND-D 556-*i* receives, for the duration τ, as one [1] of its input signals the offline status indication signal obtained as the output signal from AND-C 553-*i*, when the data enable signal is "one [1]/high [H]". OR-B 558-*i* and OR-A 557-*i* receive as one [1] of their input signals the output signal from AND-D 556-*i*. This causes OR-A 557-*i* to generate a simulated end-of-data signal for the data packet S2 for the duration τ. Also, contemporaneously during the same duration τ, OR-A 557-*i* allows the validity confirmation signal S3 at "one [1]/high [H]" to pass through, such that the switching unit 440 can receive the simulated end-of-data signal. RSL-A 551-*i* receives at its reset signal the output signal from OR-B 558-*i*. The simulated end-of-data signal resets the output signal from RSL-A 551-*i* to "zero [0]/low [L]".

Since a transmission of an end-of-data signal produces an error when the switching unit 440 transmits the data enable signal having a value "zero [0]/low [L]", the OR-A 557-*i* supplies to the switching unit 440 the transformed validity confirmation signal for the same duration τ at the time at which the data enable signal rises to "one [1]/high [H]" after going through AND-C 555-*i*.

Figure 7:
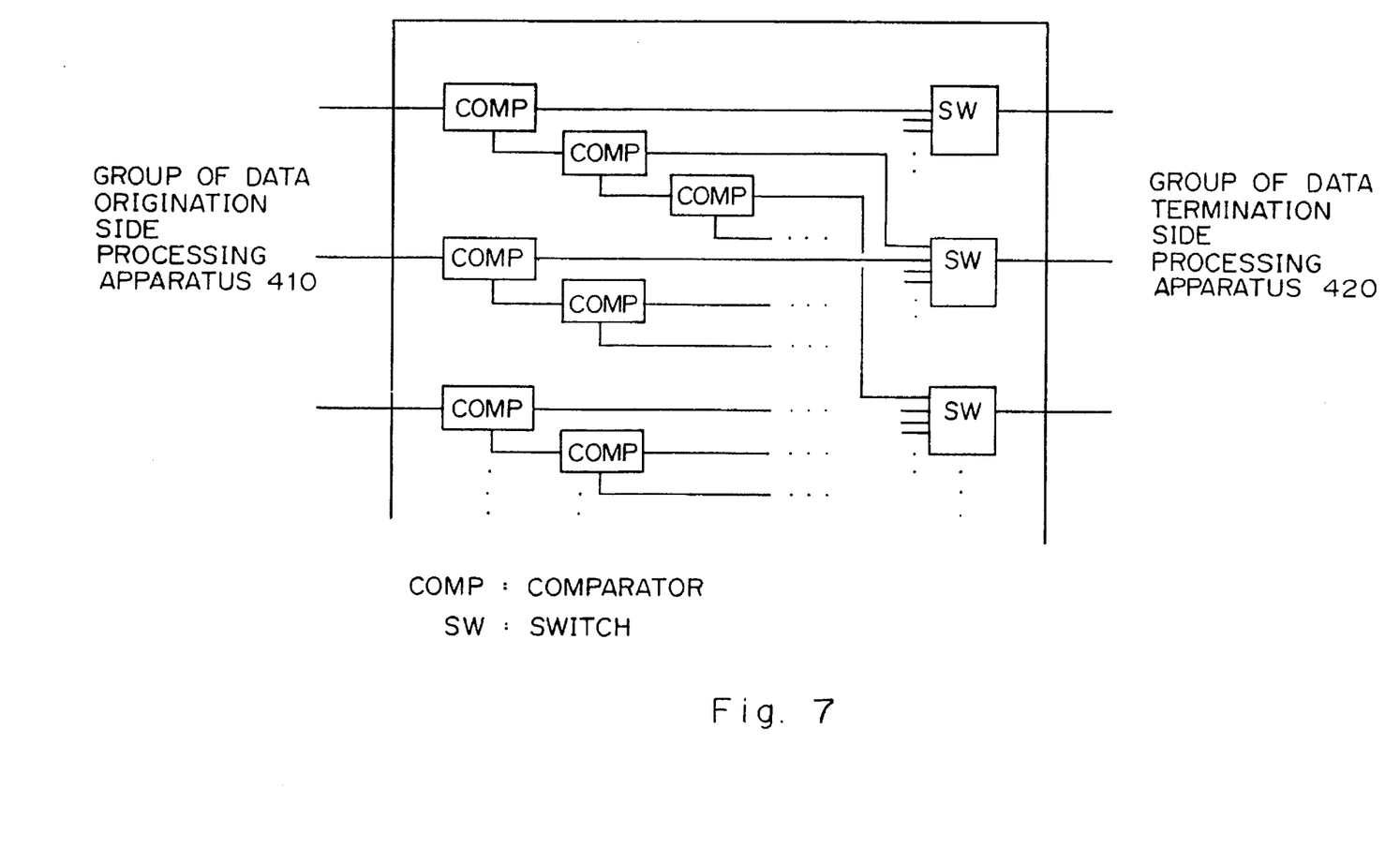
FIG. 7 is a block diagram of a switching unit.

FIG. 7 is a block diagram of a switching unit.

More specifically, FIG. 7 shows a structure of the switching unit 440 for use in the preferred embodiment.

The switching unit 440 comprises a plurality of comparators (COMPs) and switches (SWs) for setting paths along which data packets are transferred.

Each comparator (COMP) has an identification number corresponding to a member in the group of data termination side processing apparatuses 420 for comparison with the apparatus identification (ID) 200 at the head end of a data packet. If the comparison indicates a match, the comparator (COMP) transfers the data packet to a switch (SW). If the comparison indicates a mismatch, the comparator (COMP) transfers the data packet to a different comparator (COMP).

Each switch (SW) sets a path connecting the apparatus transmitting the data packet (out of the plurality of data origination side processing apparatuses 410-1, 410-2, ... ) with the apparatus receiving the data packet (out of the plurality of data termination side processing apparatuses 420-1, 420-2, ... ) designated by the apparatus identification (ID) 200 at the head end of the data packet, and cancels the path on receiving the end-of-data signal (E) 210 at the tail end of the data packet.

As explained in the descriptions of FIGS. 5 and 6, when the data origination side processing apparatus 410-*i* experiences a stop, the networking apparatus 430 has the offline status detecting unit 450-*i* and the controlling unit 460-*i* generate a simulated end-of-data signal as an input signal to the switching unit 440. The simulated end-of-data signal enables the switching unit 440 to cancel the path of the aborted data packet and the data termination side processing apparatus 420-*k* to consummate data communications.

What is claimed is:

1. A networking apparatus, connected to a plurality of processing apparatus on a data origination side and on a data termination side, including a switching unit for setting a path for transferring data from one of said processing apparatus on said data origination side to one of said processing apparatus on said data termination side in response to an identification signal attached to said data, comprising:

status detecting means for detecting a suspension of said data transfer due to a crash of said one processing apparatus on said data origination side by using a communication status indication signal; and controlling means for generating an end-of-data signal in response to said status detecting means detecting said data transfer suspension, and for releasing said path connected to said crashed one processing apparatus on said data origination side by supplying said end-of-data signal to said switching unit through a data output line of said crashed one processing apparatus on said data origination side, to deal with a networking processing apparatus communication failure in said network apparatus.

2. The networking apparatus according to claim 1, wherein:

said status detecting means sends said communication status indication signal for off-line communication to said controlling means upon detecting said stop in said processing apparatus on the data origination side.

3. The networking apparatus according to claim 2, wherein:

said controlling means generates said simulated end-of-data signal upon receiving said communication status indication signal output from said status detecting means.

4. The networking apparatus according to claim 2, wherein:

said status detecting means comprises:
a first flip-flop for receiving said communication status indication signal falling to "zero/low" when said processing apparatus on the data origination side experiences said stop,
an inverter for receiving an output from said first flip-flop,
a first AND gate for receiving as its two inputs respective outputs from a second flip-flop and said inverter, and
a second AND gate for receiving an output from said first flip-flop; and said first AND gate transmits to said controlling means, for a predetermined duration, said status indication signal indicating said stop in said processing apparatus on the data origination side.

5. The networking apparatus according to claim 4, wherein:

said controlling means comprises:
said second flip-flop for receiving a data packet from said processing apparatus on the data origination side,
a third flip-flop for receiving from said processing apparatus on the data origination side said validity confirmation signal, indicating to said switching means that said data packet carries a payload,
a first set-reset latch for receiving as its set input an output from said first AND gate in said status detecting means,
a second set-reset latch for receiving as its set input an output from said second AND gate in said status detecting means,
a third AND gate for receiving an output from said first set-reset latch and a data enable signal for notifying said processing apparatus on the data origination side of the readiness of said switching unit for a data transfer,
a fourth AND gate for receiving as its two inputs respective outputs from said third AND gate and said second set-reset latch, a first OR gate for receiving outputs from said third AND gate and said second set-reset latch, and a second OR gate for receiving outputs from said second AND gate and said fourth AND gate; and said controlling means generates said simulated end-of-data signal, based on said status indication signal generated by said status detecting means and output from said first AND gate, for output via said first OR gate to said switching unit, thereby consummating said data transfer from said processing apparatus on the data origination side.

6. The networking apparatus according to claim 1, further comprising:

a plurality of said status detecting means provided corresponding to said plurality of processing apparatus on said data origination side, respectively; and a plurality of said controlling means provided corresponding to said plurality of status detecting means, respectively, and connected to said switching unit to enable high speed networking communications between a plurality of processors.

* * * * *